US005779340A

United States Patent [19]
Maeda

[11] Patent Number: 5,779,340
[45] Date of Patent: Jul. 14, 1998

[54] VEHICLE LAMP AND METHOD OF MANUFACTURING THE SAME

[75] Inventor: Masahiro Maeda, Shizuoka, Japan

[73] Assignee: Koito Manufacturing Co., Ltd., Tokyo, Japan

[21] Appl. No.: 549,531

[22] Filed: Oct. 27, 1995

[30] Foreign Application Priority Data

Oct. 28, 1994 [JP] Japan .................................... 6-287167

[51] Int. Cl.[6] ................................ F21V 7/06; B60Q 1/04

[52] U.S. Cl. ........................... 362/61; 362/297; 362/346; 362/304; 362/348

[58] Field of Search ............................ 362/61, 304, 346, 362/347, 350, 297, 296, 341, 348; 359/869, 900

[56] References Cited

U.S. PATENT DOCUMENTS

| | | | |
|---|---|---|---|
| 1,610,124 | 12/1926 | Godley | 362/304 |
| 1,726,379 | 8/1929 | Benford . | |
| 1,903,417 | 4/1933 | Grant . | |
| 3,700,883 | 10/1972 | Donohue et al. . | |
| 4,417,300 | 11/1983 | Bodmer . | |
| 4,495,552 | 1/1985 | Graff . | |
| 4,608,512 | 8/1986 | Rakitsch . | |
| 5,034,867 | 7/1991 | Mayer | 362/348 |
| 5,136,491 | 8/1992 | Kano | 362/347 |
| 5,258,897 | 11/1993 | Nino | 362/348 |
| 5,361,193 | 11/1994 | Nino | 362/348 |
| 5,406,464 | 4/1995 | Saito | 362/348 |
| 5,408,363 | 4/1995 | Kano | 362/347 |

FOREIGN PATENT DOCUMENTS

| | | |
|---|---|---|
| 4300103A1 | 8/1993 | Germany . |
| 2262980 | 7/1993 | United Kingdom . |

OTHER PUBLICATIONS

Translation into English of (German) Office Action.

*Primary Examiner*—Thomas M. Sember
*Attorney, Agent, or Firm*—Sughrue, Mion, Zinn, Macpeak & Seas, PLLC

[57] ABSTRACT

To form a reflection surface, a free curved surface conformed to a configuration of a car body is set for a fundamental surface of a reflection surface. A group of paraboloids of revolution having different focal distances are set, thereby to determine a group of closed curves as the lines of intersection of the fundamental surface and the group of paraboloids of revolution. The respective paraboloids of revolution are partially allotted to a portion between each pair of the adjacent closed curves of the closed curve group, whereby a plural number of reflection steps are formed. The reflection steps are arranged about the central parts in multiple loops, and the central parts are offset from the principal optical axis of the reflection mirror.

21 Claims, 12 Drawing Sheets

VEHICLE LAMP AND METHOD OF MANUFACTURING THE SAME

BACKGROUND OF THE INVENTION

The present invention relates to a lamp of a vehicle. More particularly, the invention relates to a novel reflection mirror of a vehicle lamp which removes the difficulty in the surface working when a number of reflection step faces arranged in multiple loops are formed on a fundamental surface conformed to a configuration of a car body, and a method of manufacturing the reflection mirror.

As for recent styling of the automobiles, there is a design trend to round or streamline a car body in shape in the light of aerodynamics and design. In this circumstance, an attempt to reduce the vertical length of the lamp (design trend of height reduction) has been made.

If the height of the lamp is reduced, the area of the reflection surface is also reduced, as a matter of course. Therefore, it is preferable to use a reflection mirror having the reflection surface of which the solid angle when the reflection angle is seen from the light emission center of a light source is as large as possible. That is, as shown in FIG. 16, when comparing with the paraboloid of revolution indicated by a two-dot chain line, one may adopt a curved surface such as a reflection surface a having a solid angle ω, when one sees the reflection surface from the light emission center P of a light source, set to be larger than a solid angle of the paraboloid of revolution.

In GB 2 262 980 assigned to the same assignee as this application, there has been proposed a reflection mirror in which the reflection surface consists of a number of reflection steps disposed in a looped fashion about an optical axis of the reflection mirror. In the reflection mirror, the fundamental surface of the reflection surface is formed as a free curved surface. When the reflection steps are allotted to the fundamental surface, the reflection surface is formed such that the tangential vector of a micro-reflection face at a reflection point on the reflection step is coincident with the outer product of a normal vector of the micro-reflection face at the reflection point and a normal vector of an osculating plane on the fundamental surface.

A metal mold for manufacturing such a reflection mirror is formed in the following steps of forming a fundamental surface of the reflection surface as a free curved surface conformed to a configuration of a car body, setting a reference line on the fundamental surface, and designating a plural number of reflection points on the reference line, setting micro-reflection faces at the reflection point by using the rule of reflection so that when light beams, which are emitted from a light source and directed to the reflection points, are reflected at the reflection points, these reflection light beams are parallel to the optical axis, and generating closed curves by a spline approximation in which direction vectors at the plural number of reflection points arranged about the optical axis are used as the tangential vectors. In this case, the outer product of the normal vector of the micro-reflection face at the reflection point and a normal vector on the fundamental surface at the reflection point is used as the direction vector for determining the orientation of the reflection step formed. Further, V-shaped grooves which have the slant faces corresponding to the micro-reflection faces at the respective reflection points, are formed along the closed curves on the metal mold.

FIG. 17 is a view showing an example of the reflection surface of a reflection mirror b which has the step faces formed by the method as mentioned above. As shown, a multiple of closed curves q are formed about the axis f—f of the light source, and reflection steps are formed in a looped fashion, using the closed curves g as reference lines. In other words, the adjacent closed curves are disposed so as not to intersect, and the axis f—f passes through the center of a group of closed curves.

When the closed curves q are always formed about the axis f—f of a light source (the principal optical axis of the reflection mirror), and the reflection steps are allotted along those closed curves, according to the shape of the fundamental surface, a metal mold cannot be formed for some portions of the reflection mirror so that the portions of the reflection mirror cannot be used as an effective reflection surface.

FIG. 18 is an explanatory diagram for explaining why the metal mold of the reflection mirror cannot be formed on a specific portion of the reflection mirror. A front view of a surface h as a fundamental surface of the reflection surface is shown in the upper portion of FIG. 18, and closed curves i are set on the fundamental surface h. A mark "X" indicates a position where the axis f—f of the light source intersects the surface h at the central part of the group of closed curves.

A sectional view of the surface h is illustrated in the lower portion of FIG. 18. The surface h is illustrated as a plane slanted upward to the right, for ease of explanation.

Parabolas j1 and j2 indicate the paraboloids of revolution, which form a group of paraboloids of revolution of which the axis f—f is coincident with the axis of rotation. The closed curves are formed as the lines of intersection of the surface h and the group of the paraboloids of revolution.

Since the surface h, which provides the fundamental shape of the reflection surface, is arbitrarily set as a curved surface, if a group of paraboloids of revolution, of which the axis of revolution is coincident with the axis f—f of the light source, is used, a portion where surface-working cannot be performed is present between a portion (shaded by lines slanted down to the right) between the paraboloid j1 of revolution and the surface h and a portion (shaded by lines slanted down to the left) between the paraboloid j2 of revolution and the surface h (in other words, no closed curve is formed along the boundary between those slanted portions). If this location is compulsively worked, a relation between the worked portion and the surface h is lost.

SUMMARY OF THE INVENTION

To solve the problems as mentioned above, there is provided a vehicle lamp including a reflection mirror with a reflection surface formed of a number of reflection steps which are formed in a manner that a fundamental surface of the reflection mirror is defined as a free curved surface so as to be conformed to a configuration of a car body, and respective paraboloids of revolution are partially allotted to a portion between each pair of the adjacent closed curves of a group of closed curves formed as the lines of intersection of the fundamental surface and a group of the paraboloids of revolution having different focal distances, characterized in that the reflection steps are arranged about a plurality of central parts in multiple loops, and the central parts are offset from the principal optical axis of the reflection mirror.

A method of forming the vehicle lamp including the reflection mirror, comprising the steps of:

1) forming a fundamental surface of a reflection surface as a free curved surface to conform to a configuration of a car body;

2) setting a group of paraboloids of revolution having different focal distances;

3) determining a group of closed curves as the lines of intersection of the fundamental surface and the group of paraboloids of revolution; and 4) allotting partially the respective paraboloids of revolution to a portion between each pair of the adjacent closed curves of the closed curve group, thereby arranging a number of reflection steps about the central parts in multiple loops, the central parts being offset from the principal optical axis of the reflection mirror.

In the present invention, there are provided a plural number of groups each consisting of closed curves arranged about a central part, at which the fundamental surface contacts with the paraboloid of revolution. The central part of each group of the closed curves is offset from the point of intersection of the fundamental surface and the principal optical axis. Thus, a required connection of the step faces each allotted to a portion between the adjacent closed curves is ensured. Then, a portion for which face-working can not be performed, is not created on the reflection mirror.

DETAILED DESCRIPTION OF THE INVENTION

Preferred embodiments of a reflection mirror of a vehicle lamp according to the present invention will be described with reference to the accompanying drawings.

A method of forming a reflection surface will be described with reference to FIGS. 1 to 5 before description of a shape of the reflection mirror.

Figure 1:
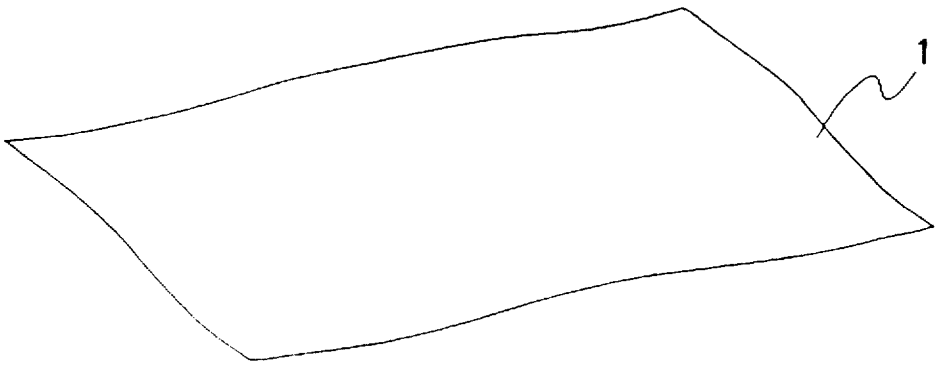
FIG. 1 is a diagram showing a free curved surface as a fundamental surface.

First, as shown in FIG. 1, a curved surface 1 which defines a fundamental shape of the reflection surface is set. The curved surface 1 as a free curved surface that cannot be mathematically expressed by an algebraical expression, is shaped so as to be conformed to a configuration of a car body, by using a CAD.

Figure 2:
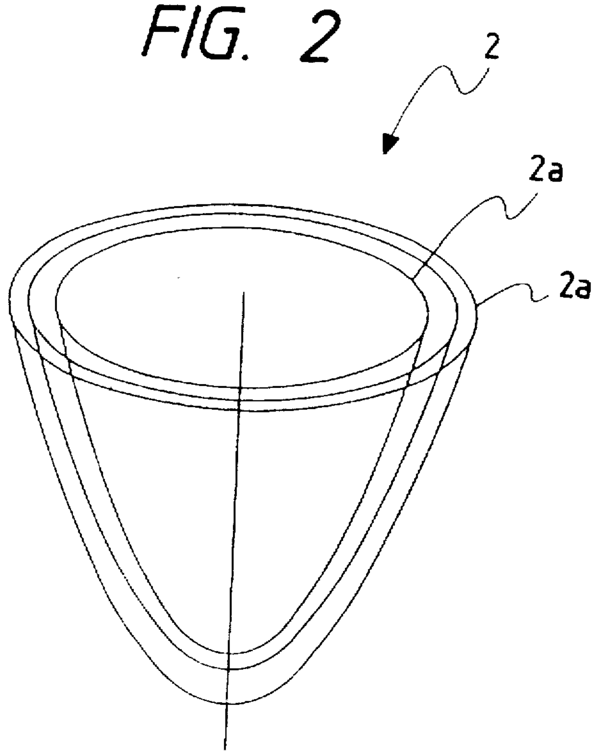
FIG. 2 is a diagram showing a group of paraboloids of revolution.

A group 2 of curved surfaces, which determines the performance of the resultant reflection surface, is prepared as shown in FIG. 2. The curved surface group 2 consists of a number of paraboloids of revolution 2*a* which have a common axis of rotational symmetry and different focal distances. The paraboloids of revolution 2*a* will never spatially intersect with each other. The focal positions of the paraboloids of revolution 2*a* are not always coincident with one another. The focal points may lie dispersively within a range on the axis of the rotational symmetry.

Figure 3:
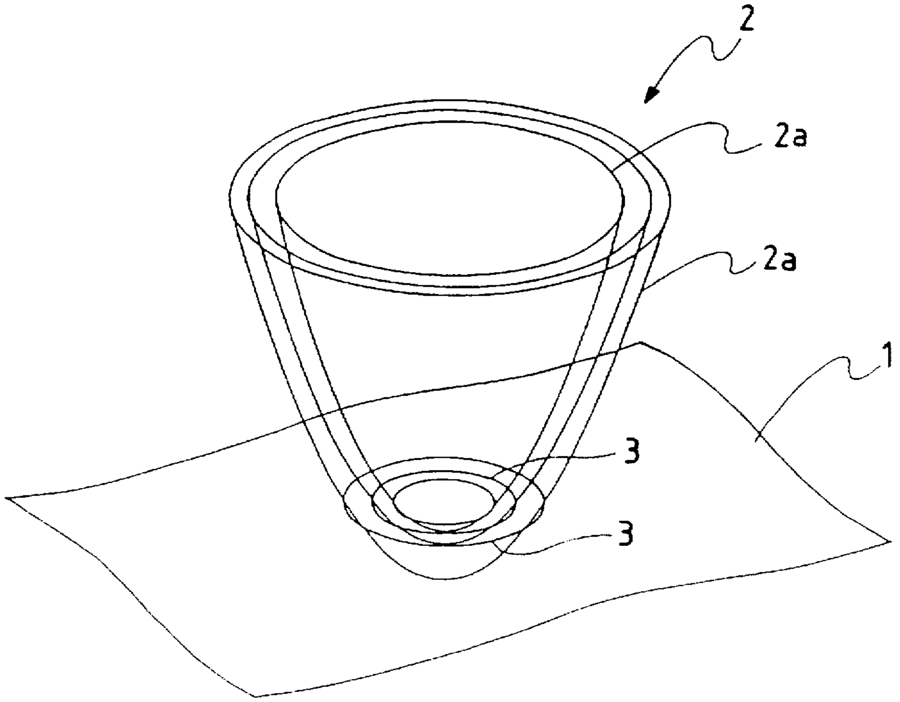
FIG. 3 is a diagram showing a group of closed curves obtained as the lines of intersection of the group of paraboloids of revolution and the fundamental surface.

The lines of intersection 3 of the curved surface 1 and the curved surface group 2 are determined as shown in FIG. 3. The lines of intersection 3 form closed curves or part of them. The lines of intersection 3 will never intersect each other on the curved surface 1. When the curved surface 1 has an axis of rotational symmetry, the central part of the closed curves of the lines of intersection 3 lies at a point where the axis of rotational symmetry intersects the curved surface. When the curved surface is not rotationally symmetric, it is determined by a point where one of the paraboloids of revolution contacts with the curved surface 1. Therefore, a point where the principal optical axis set on the reflection surface intersects the curved surface is not always at the central part of the curved surfaces. That is, when a parabola representing the paraboloid of revolution contacts with a curved line c1 representing the curved surface 1 at a point P, an axis A, which extends in parallel with the axis of rotation L of the paraboloid of revolution while passing through the point P, will never be coincident with the axis of rotation L. Generally, the number of the central parts is not always one, but there are a plural number of central parts of the closed curve groups. In an example of FIG. 5, it will readily be seen that two central parts of grouped closed curves are present if the curved surface 1 contains the axis L of revolution, and has surface symmetry with respect to a plane orthogonal to the paper surface.

Figure 4:
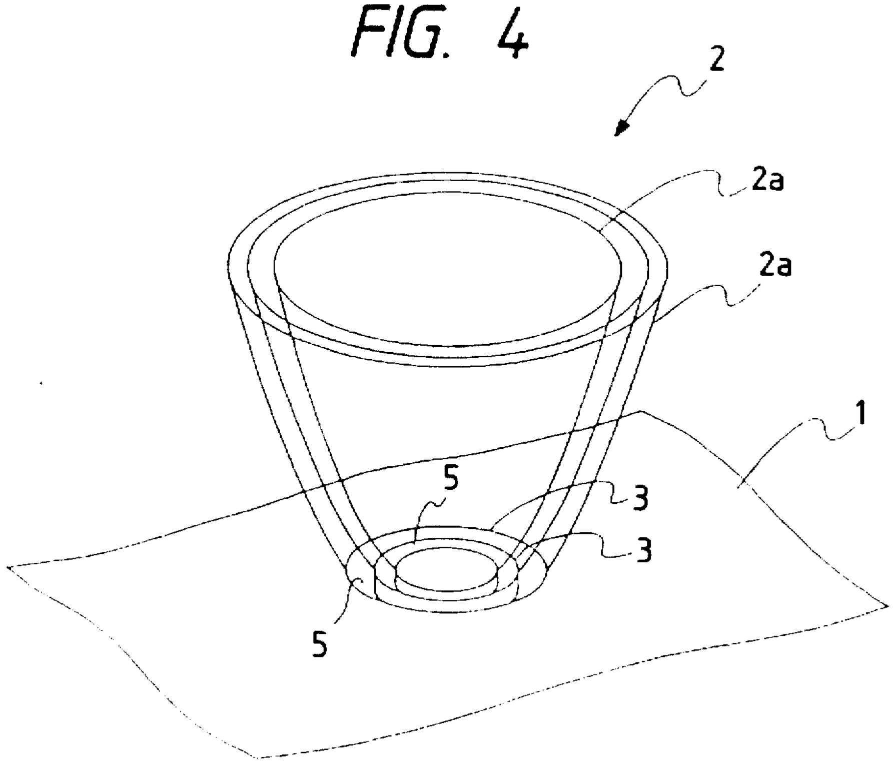
FIG. 4 is a diagram for explaining the formation of step faces.
Figure 5:
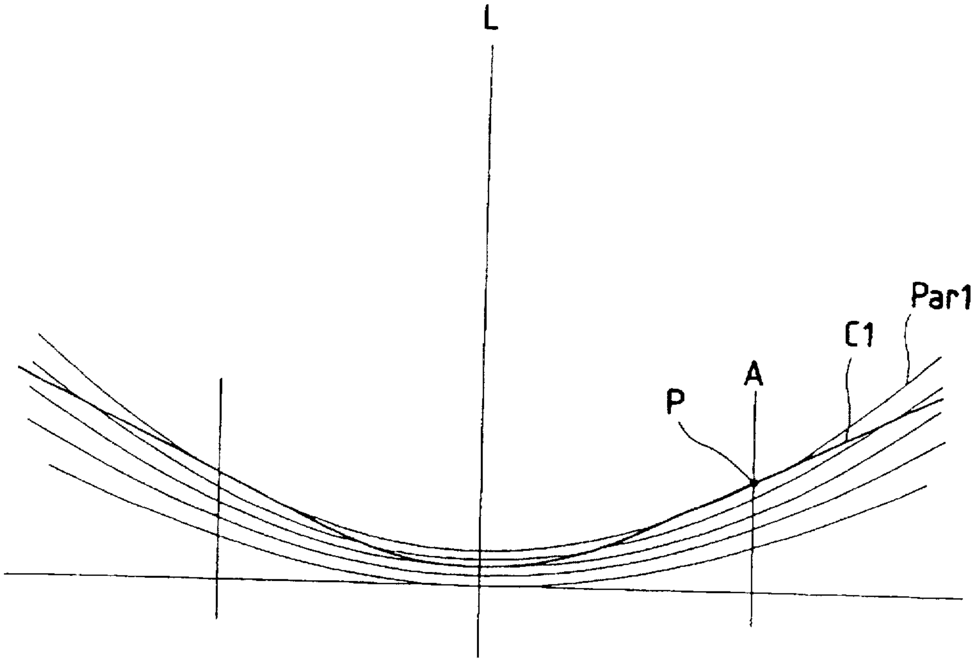
FIG. 5 is a diagram for explaining the relationship between the axis of rotational symmetry of the group of paraboloids of revolution and the center of the group of closed curves.

After the lines of intersection 3 are determined, reflection steps are determined on the basis of these lines of intersection. That is, as shown in FIG. 4, step faces 5 are each formed by allotting a part of the paraboloid of revolution to a portion between the adjacent lines of intersection. A front view showing the curved surface 1 is shown in the upper part of FIG. 6, and a cross sectional view taken along line B—B in the front view is shown in the lower part thereof. The lines of intersection on the curved surface 1 are denoted as 3*a*, 3*b*, 3c, . . . in this order from the central part 4 of the paraboloids of revolution to the outer side. These lines of intersection define the boundaries of the step faces, respectively. In the figure, broken lines indicate the paraboloids of revolution 2. A step 5a is formed within the closed line 3a of intersection; a step 5b is formed between the lines 3a and 3b of intersection; a step 5c is formed between the lines 3b and 3c of intersection. Thus, the step faces are regulated. That is, each step face is formed as a part of the paraboloids of revolution having different focal distances, and those are arrayed in a steplike arrangement when viewed in cross section.

Figure 7A:
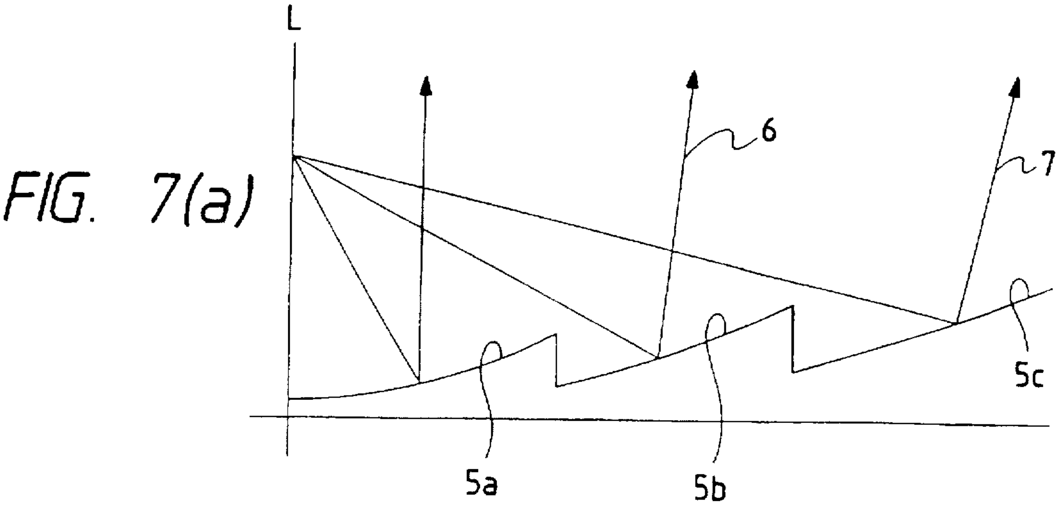
Figure 7B:
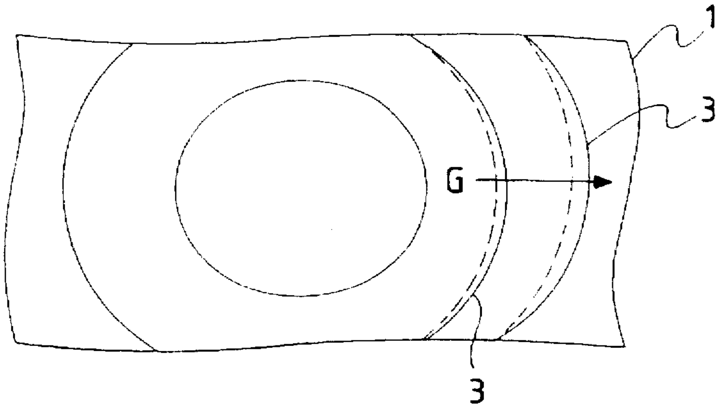
Figure 7C:
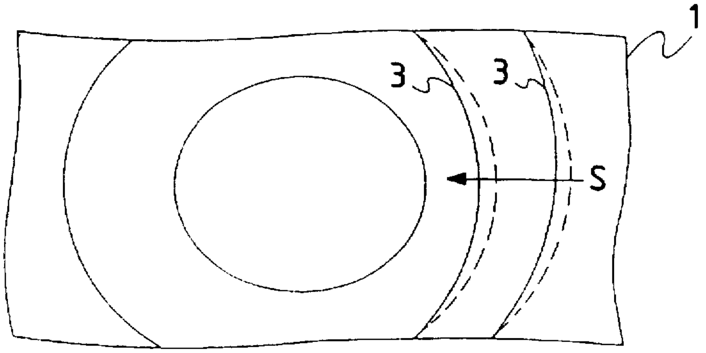

As seen from the fact that these steps are each a part of the paraboloids of revolution, when a light source is located at a common focal position thereof, the light beams reflected at the steps are parallel to the principal optical axis L of the reflection surface (viz., the axis of rotational symmetry of the paraboloids of revolution). Alternatively, the aimed direction of the reflecting light beam from the step may be varied for each step as shown by the light beams 6 and 7 in FIG. 7(a). In this case, the curvatures of the lines of intersection 3 vary with the curvatures of the curved surfaces. For example, the bulges of the lines of intersection 3 increase as in the direction of an arrow G shown in FIG. 7(b), or those decrease as in the direction of an arrow S shown in FIG. 7(c).

Figure 6:
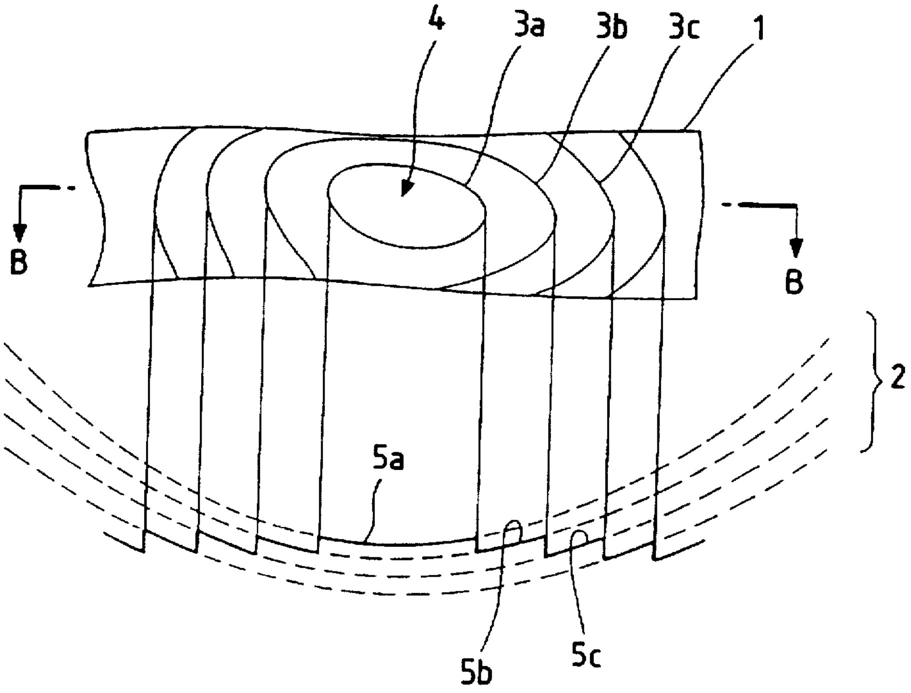
FIG. 6 is a front view of the reflection surface and a cross section of the same, FIGS. 7(*a*) to 7(*c*) are diagrams for explaining the relationship of the aiming directions of the light beams reflected at the reflection steps and the shapes of the closed curves in which FIG. 7(*a*) is a cross sectional view of reflection steps, FIG. 7(*b*) is a conceptional view showing the curved surface when the bulges of the closed curves formed thereon are increased, and FIG. 7(*c*) is a conceptional view showing the curved surface when the bulges of the closed curves formed thereon are decreased.
Figure 8:
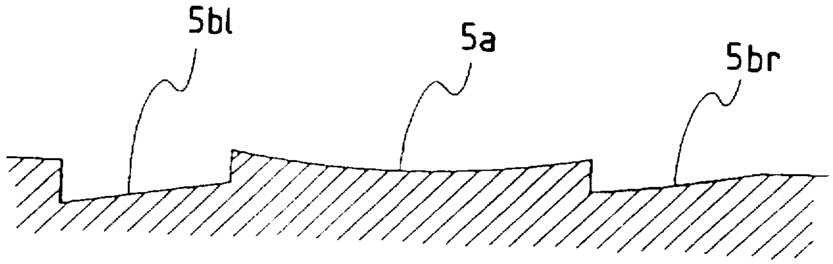
FIG. 8 is a cross sectional view showing reflection steps.
Figure 9:
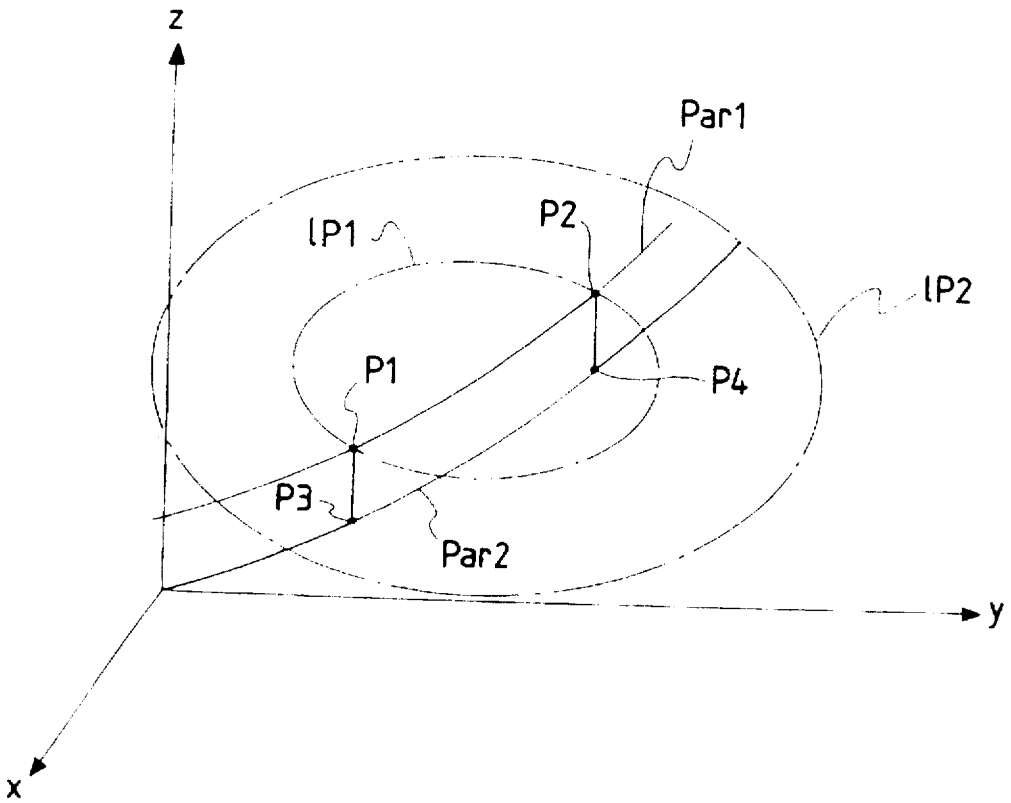
FIG. 9 is a schematically perspective view showing the relationship between the group of paraboloids of revolution and the reflection steps.
Figure 10:
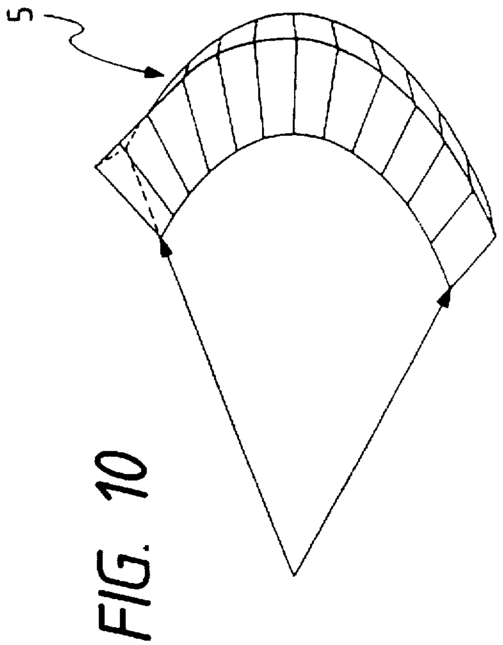
FIG. 10 is a diagram for explaining the roughness of the step faces.

In FIG. 6, the slanting direction of the step on the right side of the step 5a is opposite to that of the step on the left side of the step 5a (in this case, the step is slanted down toward the central part of the closed curve). However, a case as shown in FIG. 8 may take place. In this case, the slanting direction of a step 5br on the right side of the step 5a is the same as of a step 5bl on the left side thereof. For example, as shown in FIG. 9, let us consider a step allotted to a portion between a closed curve lP1 passing through points P1 and P2 where the paraboloid of revolution of the parabola par1 intersects the curved surface 1, and another closed curve lP2 passing through points P3 and P4 where the paraboloid of revolution of the parabola par2 intersects the curved surface 1. When the step is cut along a plane containing the points P1 to P4, and the z-axis (vertically extending in FIG. 9), the slanting directions of the step, when viewed in cross section, are the same. Thus, as schematically illustrated in FIG. 10, there is a step, a part thereof is incurved, and another part is outcurved. Those incurved and outcurved parts are alternately connected to configure the step. The thus shaped step may be formed by the curved-surface working which uses a ball end mill.

When a reflection surface having the reflection steps formed along multiple closed curves and a reflection mirror having such a reflection surface are manufactured using the CAD, CAM data for forming a metal mold for manufacturing the reflection mirror may be gathered from the reflection surface and the reflection mirror having the same.

FIGS. 11 to 14 show the feature of a shape of a reflection surface manufactured by the reflection mirror manufacturing method as mentioned above. A distribution of the closed curves on a curved surface is illustrated. In the rectangular coordinates of these figures, the X axis represents a principal optical axis; the Y axis, a horizontal axis; and a Z axis, a vertical axis.

Figure 11:
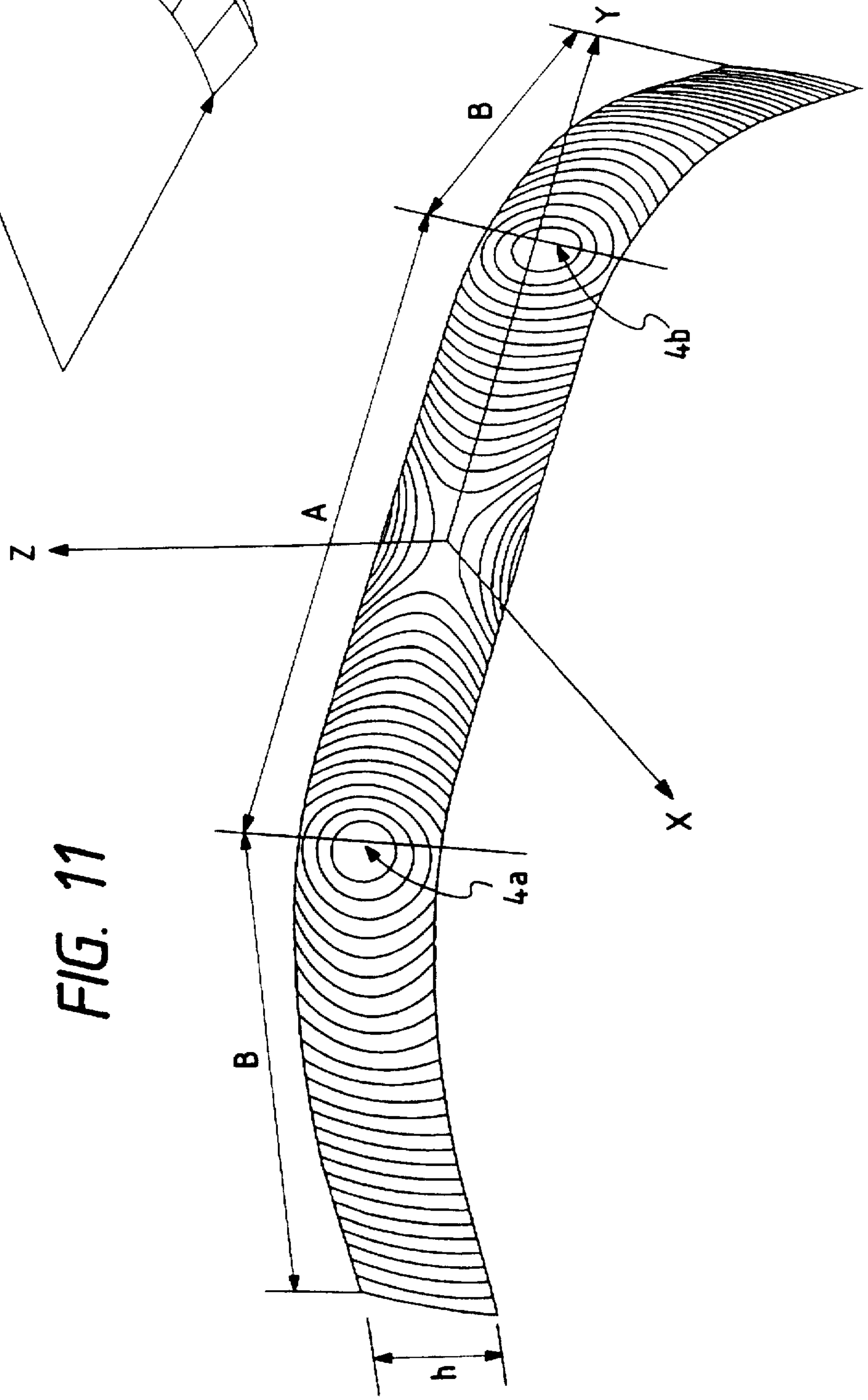
FIG. 11 is a front view showing an entire curved surface in which groups of closed curves relating to the reflection surface are distributed.

FIG. 11 shows an example in which the present invention is applied to a high-mounted stop lamp for a vehicle. The lamp has a thin configuration such that a height h is very small as compared with a length. The region A is formed into an almost flat shape and the region B is formed into an extremetely and fowardly bent shape.

As illustrated in FIG. 11, two groups of closed curves are present: the closed curves of one group are arranged about the central part 4a thereof, and those of the other group are arranged about the central part 4b thereof. Those central parts are offset from a point where the Z axis intersects the curved surface, and lie in the regions where a change of the curvatures of the curved surface are relatively great.

The curved surface is symmetric with respect to the X-Z plane. One half of the curved surface may be formed by mirror-operating the other half thereof (FIGS. 12 to 14) according to the symmetry principle.

Figure 12:
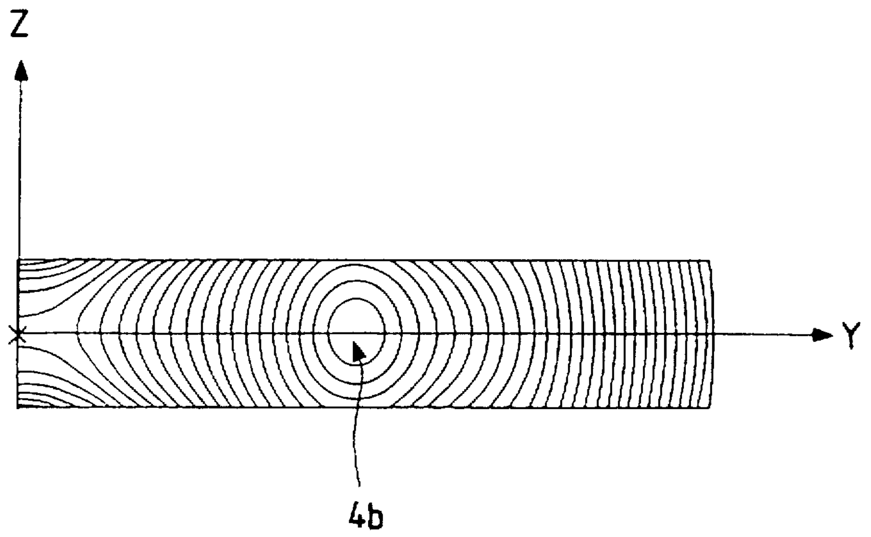
FIG. 12 is a front view showing the half of the curved surface of FIG. 11.
Figure 13:
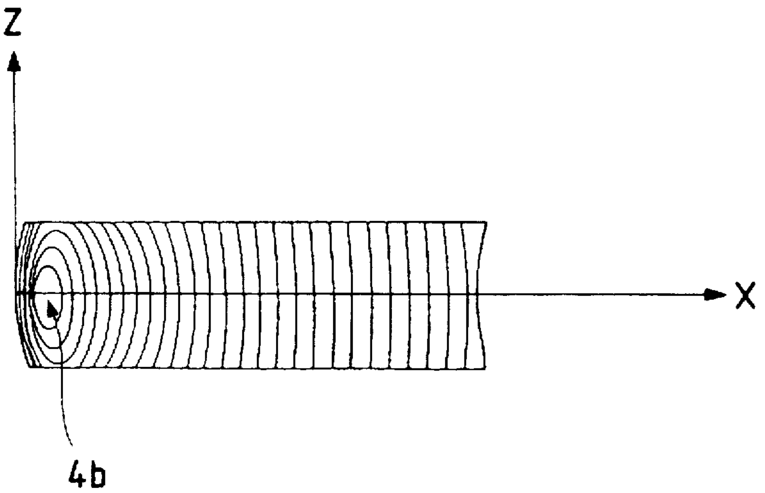
FIG. 13 is a side view showing the half of the curved surface of FIG. 11.

In the front view of FIG. 12, the central part 4b of the grouped closed curves is located on the right side of a point (marked with X) of intersection of the principal optical axis and the curved surface.

Figure 14:
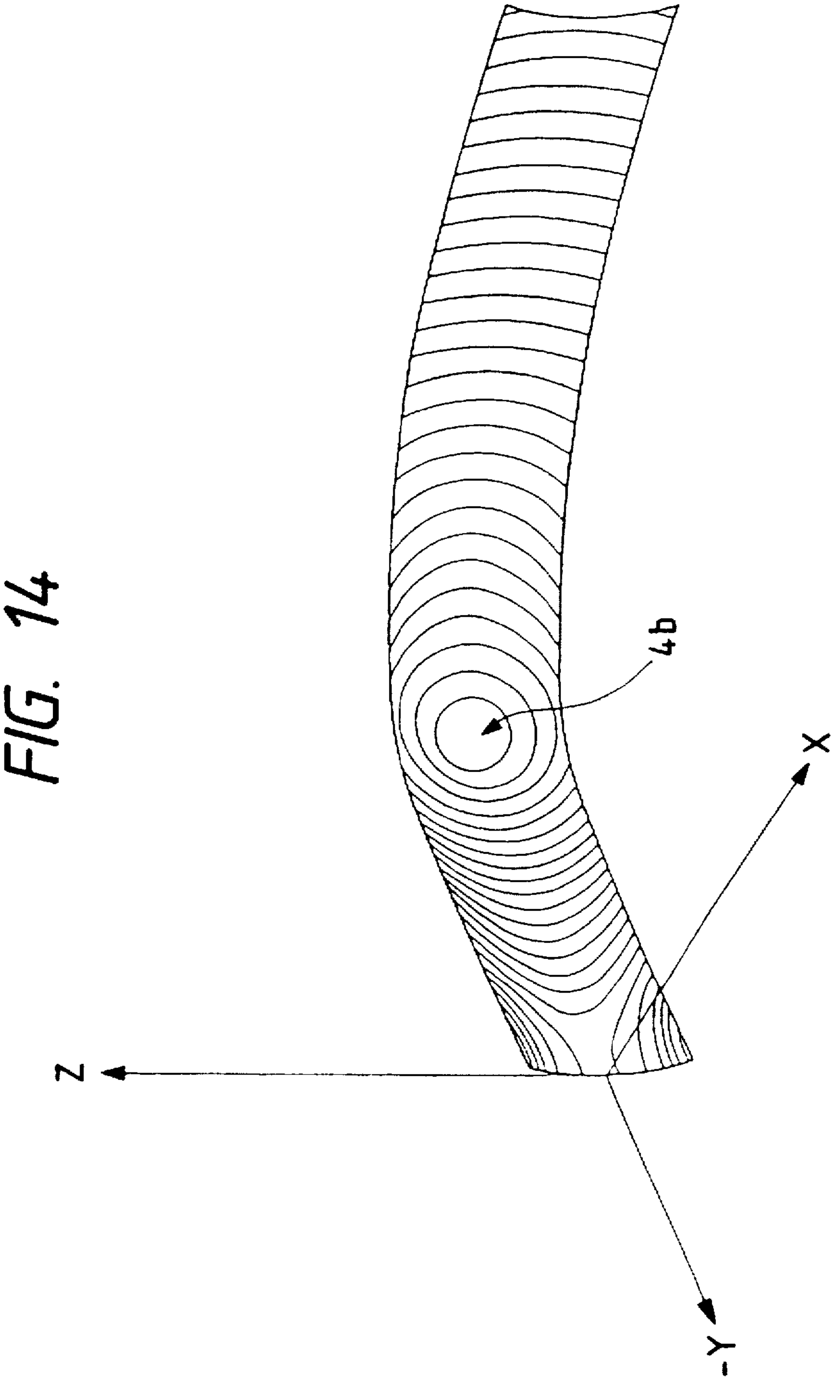
FIG. 14 is a perspective view showing the half of the curved surface of FIG. 11.

As shown in FIG. 14, the pitch of the closed curves on the right side of the central part 4b thereof is relatively large, while the pitch of the closed curves on the left side thereof is small. This arises from the fact that a change of the curvature of the fundamental curved surface on the right side of the central part 4b of the grouped closed curves is larger than that on the left side.

Figure 15:
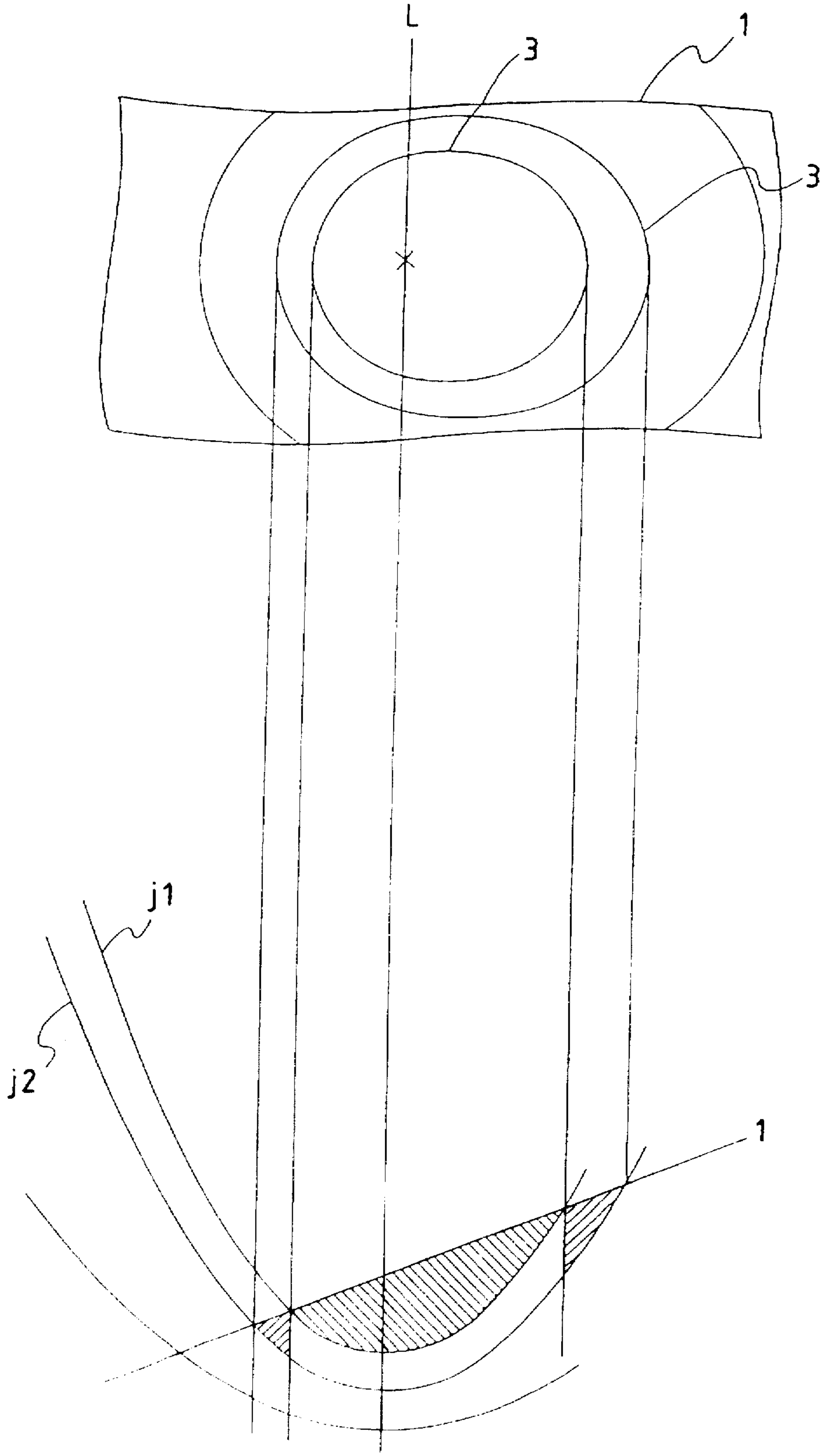
FIG. 15 is a diagram schematically showing a state in which the central part of the group of closed curves is offset from a position where the principal optical axis intersects the curved surface.
Figure 16:
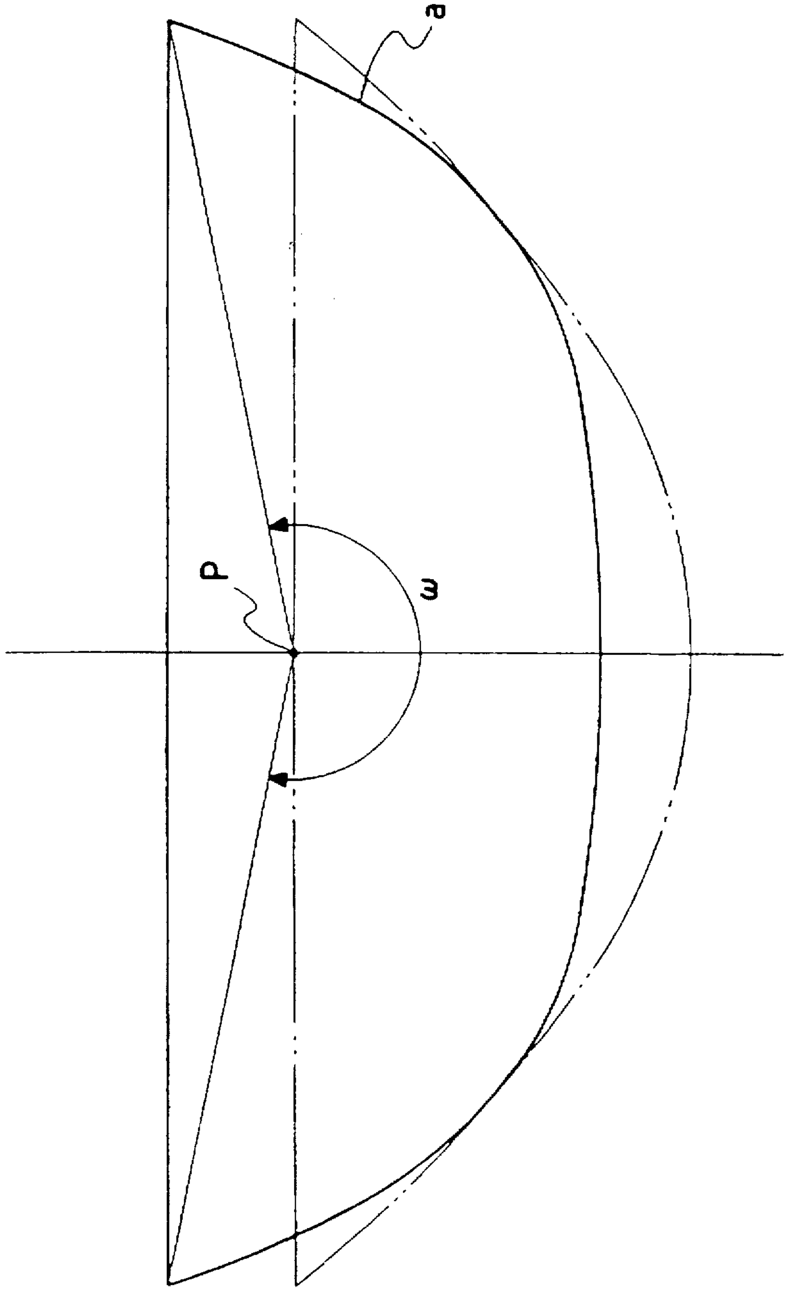
FIG. 16 is a diagram for explaining a solid angle of the reflection surface.
Figure 17:
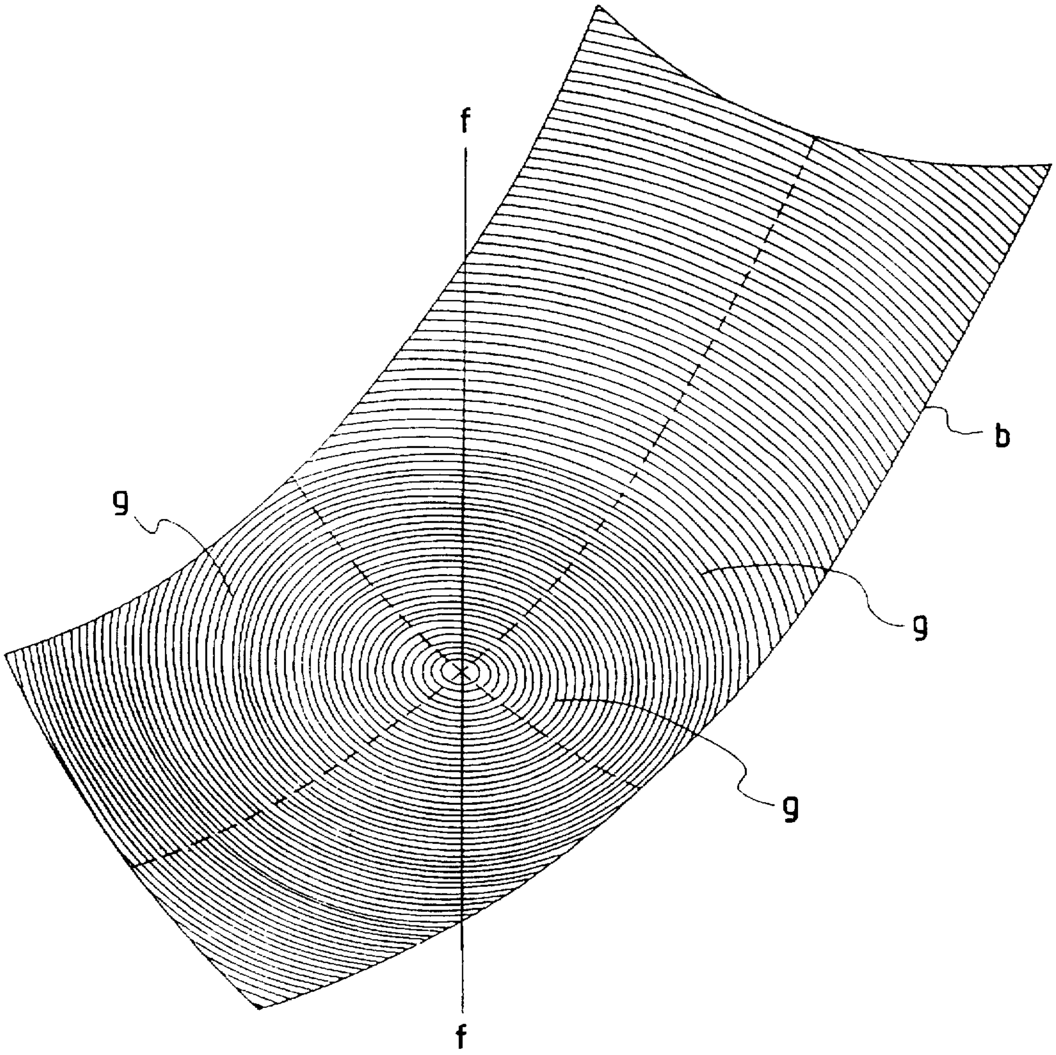
FIG. 17 PRIOR ART
FIG. 17 is a diagram showing the feature of a group of closed curves on a conventional reflection surface.
Figure 18:
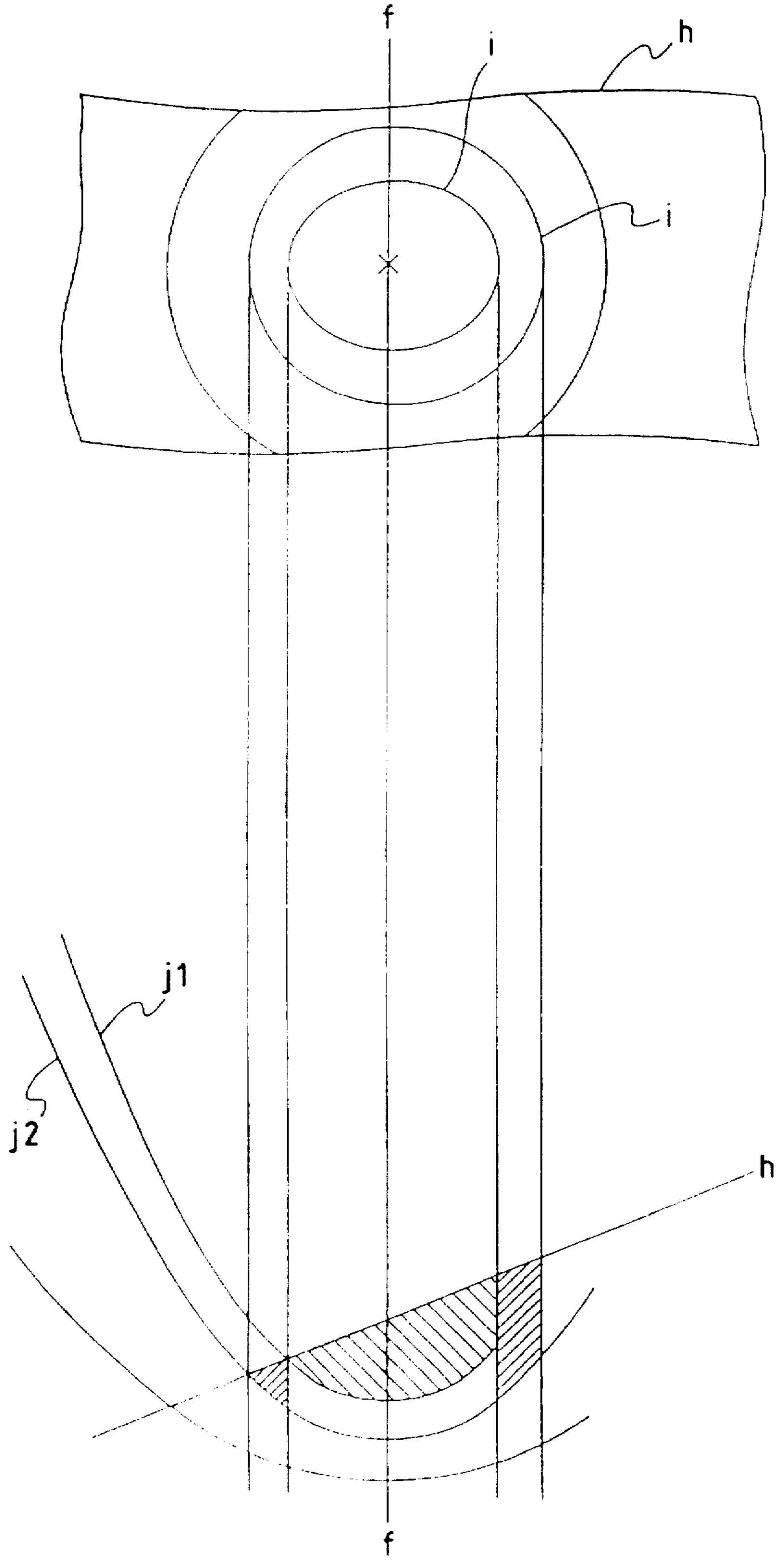
FIG. 18 PRIOR ART
FIG. 18 is a diagram for explaining the problem of the conventional lamp.

FIG. 15 schematically illustrates a state that the central part of the closed curves is offset from a point where the principal optical axis intersects the curved surface. A front view of the curved surface 1 as a fundamental surface of the reflection surface is illustrated in the upper portion of FIG. 15. Closed curves 3 are set on the curved surface 1. In the figure, a mark X indicates a point where the principal optical axis L intersects the curved surface 1. A sectional view of the curved surface 1 is illustrated in the lower portion of FIG. 15. The curved surface 1 is illustrated as a plane slanted upward to the right, for ease of explanation.

Parabolas j1 and j2 typically indicate the paraboloids of revolution, which form a group of paraboloids of revolution having the axis L as the axis of rotation. The closed curves are formed as the lines of intersection of the group of the paraboloids of revolution and the surface 1.

A closed curve appears as a boundary curve between a portion (shaded by lines slanted down to the right) between the paraboloid j1 of revolution and the curved surface 1 and a portion (shaded by lines slanted down to the left) between the paraboloid j2 of revolution and the curved surface 1. As a result, the adjacent step faces are connected while keeping the configuration of the curved surface 1.

In the reflection mirror having the reflection surface as mentioned above, the central parts of the groups of closed curves which define the orientation of the reflection steps formed are offset from the principal optical axis of the reflection mirror (viz., the axis extending through the light emission center of the light source). With such a novel and unique design freedom secured, the surface working can be done without adversely affecting the connection of the step faces when the reflection steps are formed each between the adjacent closed curves as the lines of intersection of the paraboloids of revolution and the fundamental curved surface of the reflection surface. In this case, the shape of the curved surface that provides a fundamental shape of the reflection surface, is faithfully transferred to the shape of the reflection step. As a result, there is eliminated an arbitrary shape correction when the step face is worked.

As seen from the foregoing description, in the reflection mirror of a vehicle lamp and the method of forming the reflection mirror according to the present invention, a free curved surface conformed to a configuration of a car body is set for a fundamental surface of a reflection surface, a group of paraboloids of revolution having different focal distances are set, thereby to determine a group of closed curves as the lines of intersection of the fundamental surface and the group of paraboloids of revolution, and the respective paraboloids of revolution are partially allotted to a portion between each pair of the adjacent closed curves of the closed curve group, whereby a plural number of reflection steps are arranged about a plural number of central parts in multiple loops, and the central parts are offset from the principal optical axis of the reflection mirror. With this, there is eliminated the necessity of forming the reflection steps about the principal optical axis of the reflection mirror in multiple loops. Thus, a required connection of the steps can be ensured by setting the position of the central portion of each group of closed curves with respect to the principal optical axis. Then, there arise no portion where face-working of the reflection steps can not be performed.

What is claimed is:

1. A vehicle lamp comprising a light source and a reflection mirror having a principal optical axis, said reflection mirror comprising:

a reflection surface defined by a fundamental surface and having at least a first and a second plurality of reflection steps, said fundamental surface being defined as a free curved surface so as to be conformed to a configuration of a car body;

wherein said reflection steps in each said first and second plurality of reflecting steps are formed:

(a) from a plurality of paraboloids of revolution, each paraboloid defining a paraboloid surface, said plurality of paraboloids having a common axis of rotational symmetry that passes through a central part on said fundamental surface and each paraboloid intersecting with said fundamental surface to define a closed curve thereon which is adjacent to at least one other such closed curve formed by another intersection of another paraboloid with said fundamental surface, and (b) by allotting a part of said paraboloid surface for each of said respective paraboloids of revolution between adjacent ones of closed curves formed as lines of intersection of said fundamental surface and said paraboloids of revolution having different focal distances; and wherein each of said first and second plurality of reflection steps is arranged around a respective central part in multiple loops.

2. A vehicle lamp as claimed in claim 1, wherein said central parts are offset from said principal optical axis of said reflection mirror.

3. A vehicle lamp as claimed in claim 1, wherein said central parts are positioned at points where one of said paraboloids of revolution contacts with said curved surface.

4. A method of forming a vehicle lamp having a light source and a reflection mirror with a principal optical axis, comprising the steps of;

(1) forming a fundamental surface of a reflection surface of said reflection mirror as a free curved surface conformed to a configuration of a car body;

(2) setting at least a first and a second plurality of paraboloids of revolution each paraboloid in each said first and second plurality of paraboloids having different focal distances, each paraboloid defining a paraboloid surface, each said first and second plurality of paraboloids having a respective common axis of rotational symmetry that passes through a respective central part on said fundamental surface, (3) determining closed curves as lines of intersection of said fundamental surface and said paraboloids of revolution, each paraboloid intersecting with said fundamental surface to define a closed curve thereon which is adjacent to at least one other such closed curve formed by another intersection of another said paraboloid with said fundamental surface;

(4) allotting a part of said paraboloid surface for each of said respective paraboloids of revolution between said adjacent ones of said closed curves to form a reflection step; and (5) arranging a plural number of said reflection steps about a plural number of central parts in multiple loops.

5. A method of forming a vehicle lamp as claimed in claim 4, wherein said central parts are offset from a principal optical axis of said reflection mirror.

6. A vehicle lamp comprising a light source and a reflection mirror having a principal optical axis, said reflection mirror comprising:

a reflection surface defined by a fundamental surface and having at least a first and a second plurality of reflection steps said fundamental surface being defined as a free curved surface so as to be conformed to a configuration of a car body, wherein said steps in each said first and second plurality of reflection steps are defined by a plurality of respective paraboloids of revolution, said plurality of respective paraboloids for each said first and second plurality of reflections steps having a common axis of revolution that passes through and defines a respective first and second central part on said fundamental surface, and each paraboloid in said plurality of respective paraboloids having an internal surface, each reflection step in each said first and second plurality of reflection steps being further defined as a portion of its respective paraboloid internal surface disposed between adjacent ones of closed curves formed as lines of intersection of said fundamental surface and adjacent ones of said paraboloids of revolution; and wherein said first and second plurality of reflection steps are arranged around said respective first and second central parts in multiple loops.

7. A vehicle lamp as claimed in claim 6, wherein at least one of said central parts is offset from said principal axis of said reflection mirror.

8. A vehicle lamp as defined in claim 6 wherein at least one of said central parts is positioned at a point where one of said paraboloids of revolution contacts with said curved surface.

9. A vehicle lamp as defined in claim 6 wherein said paraboloids in at least one of said first and second plurality of paraboloids of revolution have different focal distances.

10. A vehicle lamp as defined in claim 6 wherein the axis of revolution of each of said first and second plurality of paraboloids of revolution is different from said principal optical axis.

11. A vehicle lamp as defined in claim 9 wherein at least two paraboloids of said at least one plurality of paraboloids of revolution have a common focal point.

12. A vehicle lamp as defined in claim 11 wherein the aimed direction of light beams reflected at the steps is primarily parallel to said principal optical axis.

13. A vehicle lamp as defined in claim 9 wherein at least two paraboloids of said at least one plurality of paraboloids of revolution have different focal points.

14. A vehicle lamp as defined in claim 13 wherein each of said different focal points lie dispursively in a range on the axis of rotational symmetry.

15. A vehicle lamp as defined in claim 14 wherein the aimed direction of light beams reflected at the steps are primarily varied for each step and are not parallel to the principal optical axis.

16. A vehicle lamp as claimed in claim 6, wherein said central parts are offset from said principal axis of said reflection mirror.

17. A vehicle lamp as defined in claim 6 wherein said central parts are positioned at points where one of said paraboloids of revolution contacts with said curved surface.

18. A vehicle lamp as defined in claim 6 wherein said paraboloids in each of said first and second plurality of paraboloids of revolution, respectively, have different focal distances.

19. A method of forming a vehicle lamp having a light source and a reflection mirror with a principal optical axis and at least one reflecting surface, said reflecting surface being defined by a fundamental surface and having at least a first and a second plurality of reflection steps, said fundamental surface being defined as a free curved surface so as to be conformed to a configuration of a car body, comprising the steps of;

(1) forming a fundamental surface of a reflection surface of a reflection mirror as a free curved surface conformed to a configuration of a car body;

(2) generating a first and second plurality of paraboloids of revolution, each of said first and second plurality of paraboloids being generated about a respective common axis and each paraboloid in each of said first and second plurality of paraboloids and being characterized by an internal surface;

(3) determining closed curves as lines of intersection of said fundamental surface and said paraboloids of revolution; and (4) defining reflection steps in each of said first and second plurality of reflection steps as comprising a portion of said internal surface of said respective paraboloids of revolution disposed between adjacent ones of said closed curves, thereby arranging said plurality of reflection steps about a plural number of central parts in multiple loops.

20. The method of forming a vehicular lamp as claimed in claim 19, wherein at least one of said central parts is offset from said principal optical axis of said reflection mirror.

21. A method of forming a vehicle lamp as defined in claim 19 wherein said paraboloids in at least one of said first and second plurality of paraboloids of revolution have different focal distances.

* * * * *